(12) United States Patent
Spyrou et al.

(10) Patent No.: US 7,572,876 B2
(45) Date of Patent: Aug. 11, 2009

(54) SOLID POLYURETHANE POWDER COATING COMPOSITIONS CONTAINING URETDIONE GROUPS THAT ARE HARDENABLE AT LOW TEMPERATURES

(75) Inventors: Emmanouil Spyrou, Dorsten (DE); Holger Loesch, Herne (DE); Andreas Wenning, Nottuln (DE)

(73) Assignee: Evonik Degussa GmbH, Essen (DE)

( * ) Notice: Subject to any disclaimer, the term of this patent is extended or adjusted under 35 U.S.C. 154(b) by 633 days.

(21) Appl. No.: 10/836,407

(22) Filed: May 3, 2004

(65) Prior Publication Data

US 2005/0003206 A1 Jan. 6, 2005

(30) Foreign Application Priority Data

May 3, 2003 (DE) ................. 103 20 266

(51) Int. Cl.
C08G 18/16 (2006.01)
C08G 18/18 (2006.01)
C08G 18/80 (2006.01)
C08G 18/28 (2006.01)
C08G 18/10 (2006.01)
C07D 229/00 (2006.01)

(52) U.S. Cl. .................. 528/48; 528/45; 528/52; 528/85; 528/65; 427/385.5; 540/202

(58) Field of Classification Search .......... 528/48, 528/45, 52, 65, 85; 427/385.5; 540/202
See application file for complete search history.

(56) References Cited

U.S. PATENT DOCUMENTS

| | | | |
|---|---|---|---|
| 4,040,992 A | 8/1977 | Bechara et al. | |
| 4,246,380 A | 1/1981 | Gras et al. | |
| 4,302,351 A | 11/1981 | Gras et al. | |
| 4,463,154 A | 7/1984 | Disteldorf et al. | |
| 4,476,054 A | 10/1984 | Disteldorf et al. | |
| 4,483,798 A | 11/1984 | Disteldorf et al. | |
| 4,900,800 A | 2/1990 | Halpaap et al. | |
| 4,912,210 A | 3/1990 | Disteldorf et al. | |
| 4,929,724 A | 5/1990 | Engbert et al. | |
| 5,464,921 A | 11/1995 | Laas et al. | |
| 5,614,323 A | 3/1997 | Chang | |
| 5,847,044 A | 12/1998 | Laas et al. | |
| 5,854,360 A * | 12/1998 | Matsunaga et al. | 525/452 |
| 2005/0090627 A1 | 4/2005 | Wenning et al. | |
| 2005/0090636 A1 | 4/2005 | Wenning et al. | |
| 2005/0096450 A1 | 5/2005 | Spyrou et al. | |
| 2005/0096451 A1 | 5/2005 | Spyrou | |
| 2005/0119437 A1 | 6/2005 | Wenning et al. | |
| 2005/0239956 A1 | 10/2005 | Spyrou et al. | |
| 2005/0239992 A1 | 10/2005 | Spyrou et al. | |

FOREIGN PATENT DOCUMENTS

| | | |
|---|---|---|
| DE | 27 12 931 | 9/1978 |
| DE | 27 35 497 | 2/1979 |
| DE | 3030572 A1 | 3/1982 |
| DE | 3030539 A1 | 4/1982 |
| EP | 0 045 994 B1 | 2/1982 |
| EP | 0 254 152 | 1/1988 |
| EP | 0 351 873 | 1/1990 |
| EP | 0 417 603 A2 | 3/1991 |
| EP | 0 639 598 A1 | 2/1995 |
| EP | 0 669 353 A1 | 8/1995 |
| EP | 0 669 354 A1 | 8/1995 |
| EP | 0 803 524 A1 | 10/1997 |
| EP | 1 334 987 B1 | 8/2003 |
| EP | 1 362 873 A1 | 11/2003 |
| WO | WO 00/34355 | 6/2000 |

OTHER PUBLICATIONS

U.S. Appl. No. 10/836,540, filed May 3, 2004, Spyrou, et al.
U.S. Appl. No. 10/305,137, filed Nov. 27, 2002, Spyrou, et al.
U.S. Appl. No. 11/576,851, filed Apr. 6, 2007, Spyrou, et al.
U.S. Appl. No. 10/591,814, filed Sep. 6, 2006, Spyrou, et al.
U.S. Appl. No. 11/576,703, filed Apr. 5, 2007, Spyrou, et al.
U.S. Appl. No. 11/722,740, filed Jun. 25, 2007, Spyrou, et al.
U.S. Appl. No. 11/909,098, filed Sep. 19, 2007, Spyrou, et al.
U.S. Appl. No. 11/909,549, filed Sep. 24, 2007, Weiss, et al.

* cited by examiner

*Primary Examiner*—Rabon Sergent
*Assistant Examiner*—Benjamin Gillespie
(74) *Attorney, Agent, or Firm*—Oblon, Spivak, McClelland, Maier & Neustadt, P.C.

(57) ABSTRACT

A highly reactive polyurethane powder coating composition, which contains uretdione groups that are hardenable at low temperatures, contains A) at least one uretdione-containing powder coating hardener based on aliphatic, (cyclo)aliphatic or cycloaliphatic polyisocyanates and hydroxyl-containing compounds, the hardener having a melting point of from 40 to 130° C., a free NCO content of less than 5% by weight, and a uretdione content of 6-18% by weight; B) at least one hydroxyl-containing polymer having a melting point of from 40 to 130° C., and an OH number of between 20 and 200 mg KOH/g; C) 0.001-3% by weight of at least one tetraalkyl ammonium carboxylate catalyst, based on a total amount of components A) and B). Components A) and B) are present in a ratio so that for each hydroxyl group of component B) there is from 0.3 to 1 uretdione group of component A).

35 Claims, No Drawings

SOLID POLYURETHANE POWDER COATING COMPOSITIONS CONTAINING URETDIONE GROUPS THAT ARE HARDENABLE AT LOW TEMPERATURES

BACKGROUND OF THE INVENTION

1. Field of the Invention

The present invention relates to a solid polyurethane powder coating composition containing an uretdione group that hardens at low stoving temperatures, a process to manufacture such composition and the use of this process to manufacture plastics, in particular powder coatings, which cross link to form high gloss or matt, light and weather stable coating films.

2. Discussion of the Background

Externally or internally blocked polyisocyanates which are solid at room temperature are valuable cross linkers for thermally cross-linkable polyurethane (PUR) powder coating compositions.

For example, DE-OS 27 35 497 describes PUR powder coatings with excellent weathering and thermal stability. The cross linkers whose manufacture is described in DE-OS 27 12 931 consist of isophorondiisocyanate containing ε-caprolactam-blocked isocyanurate groups. Polyisocyanates containing urethane, biuret, and urea groups whose isocyanate groups are also blocked are also known.

The disadvantage of these externally blocked systems is the cleaving-off of the blocking agent during the thermal cross-linking reaction. As the blocking agent can thus emit into the environment, for ecological and occupational hygiene reasons, special precautions must be taken to cleanse the waste gas and/or to recover the blocking agent. In addition, the cross-linkers exhibit a low level of reactivity. Hardening temperatures of above 170° C. are required.

DE-OS 30 30 539 and DE-OS 30 30 572 describe processes for the manufacture of polyaddition compounds containing uretdione groups whose terminal isocyanate groups are irreversibly blocked with monoalcohols or monoamines. One particular disadvantage are the chain-breaking components of the cross-linkers which lead to low network densities in the PUR powder coatings and hence to poor solvent resistance.

Hydroxyl group-terminated polyaddition compounds containing uretdione groups are the subject of EP 669 353. Because of their functionality of two, they have an improved resistance to solvents. The powder coating compositions based on these polyisocyanates containing uretdione groups have one thing in common, namely that they do not emit volatile compounds during the hardening reaction. However, the minimum stoving temperature of 180° C. is high.

The use of amidines as catalysts in PUR powder coating compositions is described in EP 803 524. Although these catalysts lower the curing temperature, they result in considerable discoloration, which is generally undesirable in the coating area. The cause of this discoloration is probably the reactive nitrogen atoms in the amidines. These can react with atmospheric oxygen to form N-oxides that are responsible for the discoloration.

EP 803 524 mentions other catalysts that have been used for this purpose in the past without exhibiting any special effects on the curing temperature. These include organometallic catalysts known from polyurethane chemistry, such as dibutyl tin dilaurate (DBTL), and tertiary amines such as 1,4-diazabicylco[2.2.2]octane (DABCO).

WO 00/34355 lays claim to catalysts based on metal acetylacetonates, e.g. zinc acetylacetonate. Catalysts such as this are in fact able to lower the curing temperature of polyurethane powder coating compositions containing uretdione groups, but the main reaction products are allophanates (M. Gedan-Smolka, F. Lehmann, D. Lehmann "New catalysts for the low temperature curing of uretdione powder coatings", *International Waterborne, High solids and Powder Coatings Symposium, New Orleans*, 21-23. 2. 2001). Allophanates are the conversion products from one mol alcohol and two mols isocyanate, while in conventional urethane chemistry one mol alcohol reacts with one mol isocyanate. Hence, technically and economically valuable isocyanate groups are destroyed due to the undesired formation of allophanates.

SUMMARY OF THE INVENTION

It is an object of the present invention to provide highly reactive polyurethane powder coating compositions containing uretdione groups which can be cured at very low temperatures and which are especially suitable for the manufacture of plastics and high gloss or matt, light and weather stable powder coatings.

Another object of the present invention is a process to manufacture the powder coating composition.

It is also an object of the present invention to use the powder coating composition according to the present invention to manufacture powder coatings on metal, plastic, glass, wooden, or leather substrates or other heat-resistant surfaces.

Another object of the present invention are metal coatings, in particular for automobile bodies, motor cycles and bicycles, building sections, and household appliances, wood coating compositions, glass coating compositions, leather coating compositions and plastic coating compositions, containing the polyurethane powder coating composition.

This and other objects have been achieved by the present invention the first embodiment of which includes a highly reactive polyurethane powder coating composition, comprising:

A) at least one uretdione powder coating hardener, based on aliphatic, (cyclo)aliphatic or cycloaliphatic polyisocyanates and compounds containing hydroxyl groups, said hardener having a melting point of 40 to 130° C., a free NCO content of less than 5% by weight and a uretdione content of 6-18% by weight, B) at least one polymer containing a hydroxyl group with a melting point of 40 to 130° C. and an OH value between 20 and 200 mg KOH/g, C) 0.001-3% by weight, based on a total weight of components A) and B), of at least one catalyst having the formula $(NR^1R^2R^3R^4)^+[R^5COO]^-$, wherein $R^1$-$R^4$ simultaneously or independent of each other are alkyl, aryl, aralkyl, heteroaryl, alkoxyalkyl radicals, optionally linear or branched, unbridged or bridged with other $R^1$-$R^4$ radicals, with the formation of cycles, bicycles or tricycles and wherein the bridging atoms, in addition to carbon, are optionally heteroatoms, with 1-18 carbon atoms and wherein every $R^1$-$R^4$ radical also has one or more alcohol, amino, ester, keto, thio, urethane, urea, allophanate groups, double bonds, triple bonds, or halogen atoms, and $R^5$ is an alkyl, aryl, aralkyl, heteroalkyl, alkoxyalkyl radical, linear or branched with 1-18 carbon atoms and optionally having one or more alcohol, amino, ester, keto, thio, urethane, urea, allophanate groups, double bonds, triple bonds or halogen atoms;

wherein components A) and B) are in a such ratio so that there is 0.3 to 1 uretdione group of component A) for each hydroxyl group of component B).

In another embodiment, the present invention includes a process for preparing a highly reactive polyurethane powder coating composition, comprising:

admixing the following components A), B), C) and optionally D) in a heatable mixer at a temperature of not more than 130° C.;

wherein

A) at least one uretdione powder coating hardener, based on aliphatic, (cyclo)aliphatic or cycloaliphatic polyisocyanates and compounds containing hydroxyl groups, said hardener having a melting point of 40 to 130°C., a free NCO content of less than 5% by weight and a uretdione content of 6-18% by weight, B) at least one polymer containing a hydroxyl group with a melting point of 40 to 130° C. and an OH value between 20 and 200 mg KOH/g, C) 0.001-3% by weight, based on a total weight of components A) and B), of at least one catalyst having the formula $(NR^1R^2R^3R^4)^+[R^5COO]^-$, wherein $R^1$-$R^4$ simultaneously or independent of each other are alkyl, aryl, aralkyl, heteroaryl, alkoxyalkyl radicals, optionally linear or branched, unbridged or bridged with other $R^1$-$R^4$ radicals, with the formation of cycles, bicycles or tricycles and wherein the bridging atoms, in addition to carbon, are optionally heteroatoms, with 1-18 carbon atoms and wherein every $R^1$-$R^4$ radical also has one or more alcohol, amino, ester, keto, thio, urethane, urea, allophanate groups, double bonds, triple bonds, or halogen atoms, and $R^5$ is an alkyl, aryl, aralkyl, heteroalkyl, alkoxyalkyl radical, linear or branched with 1-18 carbon atoms and optionally having one or more alcohol, amino, ester, keto, thio, urethane, urea, allophanate groups, double bonds, triple bonds or halogen atoms;

D) optionally, 0.1 to 10% by weight of at least one compound that is reactive with acid groups, based on a total amount of said powder coating composition, wherein components A) and B) are in a such ratio so that there is 0.3 to 1 uretdione group of component A) for each hydroxyl group of component B).

In yet another embodiment, the present invention includes a method of curing a powder coating composition, comprising:

curing the above powder coating composition at a temperature of not more than 160° C.

In another embodiment, the present invention relates to a catalyst, comprising:

a compound of the formula

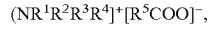

$(NR^1R^2R^3R^4)^+[R^5COO]^-$, wherein $R^1$-$R^4$ simultaneously or independent of each other are alkyl, aryl, aralkyl, heteroaryl, alkoxyalkyl radicals, optionally linear or branched, unbridged or bridged with other $R^1$-$R^4$ radicals, with the formation of cycles, bicycles or tricycles and wherein the bridging atoms, in addition to carbon, are optionally heteroatoms, with 1-18 carbon atoms and wherein every $R^1$-$R^4$ radical also has one or more alcohol, amino, ester, keto, thio, urethane, urea, allophanate groups, double bonds, triple bonds, or halogen atoms, and $R^5$ is an alkyl, aryl, aralkyl, heteroalkyl, alkoxyalkyl radical, linear or branched with 1-18 carbon atoms and optionally having one or more alcohol, amino, ester, keto, thio, urethane, urea, allophanate groups, double bonds, triple bonds or halogen atoms.

DETAILED DESCRIPTION OF THE INVENTION

It was surprisingly discovered that tetraalkyl ammonium carboxylates accelerate reverse cleavage to such an extent that when uretdione powder coating hardener is used the curing temperature of powder coating compositions can be considerably reduced.

The present invention relates to a highly reactive polyurethane powder coating composition, containing A) at least one uretdione powder coating hardener, based on aliphatic, (cyclo)aliphatic or cycloaliphatic polyisocyanates and compounds containing hydroxyl groups, the hardener having a melting point of 40 to 130° C., a free NCO content of less than 5% by weight and a uretdione content of 6-18% by weight, B) at least one polymer containing a hydroxyl group with a melting point of 40 to 130° C. and a OH value between 20 and 200 mg KOH/g, C) at least one catalyst with the formula $(NR^1R^2R^3R^4)^+[R^5COO]^-$, wherein $R^1$-$R^4$ simultaneously or independent of each other can be alkyl, aryl, aralkyl, heteroaryl, alkoxyalkyl radicals, optionally linear or branched, unbridged or bridged with other $R^1$-$R^4$ radicals, with the formation of cycles, bicycles or tricycles and where the bridging atoms, in addition to carbon, can also be heteroatoms, with 1-18 carbon atoms and where every $R^1$-$R^4$ radical also has one or more alcohol, amino, ester, keto, thio, urethane, urea, allophanate groups, double bonds, triple bonds, or halogen atoms, and $R^5$ is an alkyl, aryl, aralkyl, heteroalkyl, alkoxyalkyl radical, linear or branched with 1-18 carbon atoms and can also have one or more alcohol, amino, ester, keto, thio, urethane, urea, allophanate groups, double bonds, triple bonds or halogen atoms.

D) optionally, 0.1 to 10% by weight of at least one compound that is reactive with acid groups, based on a total amount of the composition, E) optionally, auxiliary substances and additives, so that the two components A) and B) are in a such ratio so that there is 0.3 to 1 uretdione group of component A) for each hydroxyl group of component B), the proportion of the catalysts under C) is 0.001-3% by weight based on the total weight of components A) and B).

The melting point of the uretdione-containing powder coating hardener includes all values and subvalues therebetween, especially including 50, 60, 70, 80, 90, 100, 110 and 120° C. The free NCO content of the uretdione-containing powder coating hardener includes all values and subvalues between 0 and less than 5% by weight, especially including 0.5, 1, 1.5, 2, 2.5, 3, 3.5, 4 and 4.5% by weight. The uretdione content of the uretdione-containing powder coating hardener includes all values and subvalues therebetween, especially including 8, 10, 12, 14 and 16% by weight. The melting point of the hydroxyl-containing polymer includes all values and subvalues therebetween, especially including 50, 60, 70, 80, 90, 100, 110 and 120° C. The OH number of the hydroxyl-containing polymer includes all values and subvalues therebetween, especially including 30, 40, 50, 60, 70, 80, 90, 100, 110, 120, 130, 140, 150, 160, 170, 180 and 190 mg KOH/g. The amount of D) includes all values and subvalues therebetween, especially including 0.5, 1, 1.5, 2, 2.5, 3, 3.5, 4, 4.5, 5, 5.5, 6, 6.5, 7, 7.5, 8, 8.5, 9 and 9.5% by weight. The amount of uretdione groups of A) per hydroxyl groups of B) includes all values and subvalues therebetween, especially including 0.2, 0.3, 0.4, 0.5, 0.6, 0.7, 0.8 and 0.9. The amount of C) includes all values and subvalues therebetween, especially including 0.005, 0.01, 0.05, 0.1, 0.5, 1, 1.5, 2 and 2.5% by weight.

Another object of the present invention is a process to manufacture the powder coating composition.

It is also an object of the present invention to use the powder coating composition according to the present invention to manufacture powder coatings on metal, plastic, glass, wooden, or leather substrates or other heat-resistant surfaces.

Another object of the present invention are metal coatings, in particular for automobile bodies, motor cycles and bicycles, building sections, and household appliances, wood coating compositions, glass coating compositions, leather coating compositions and plastic coating compositions, containing a polyurethane powder coating composition of A) at least one uretdione powder coating hardener, based on aliphatic, (cyclo)aliphatic or cycloaliphatic polyisocyanates and compounds containing hydroxyl groups, the hardener having a melting point of 40 to 130° C., a free NCO content of less than 5% by weight and a uretdione content of 6-18% by weight, B) at least one polymer containing a hydroxyl group with a melting point of 40 to 130° C. and a OH value between 20 and 200 mg KOH/g, C) at least one catalyst with the formula $(NR^1R^2R^3R^4]^+$ $[R^5COO]^-$, wherein $R^1$-$R^4$ simultaneously or independent of each other can be alkyl, aryl, aralkyl, heteroaryl, alkoxyalkyl radicals, optionally linear or branched, unbridged or bridged with other $R^1$-$R^4$ radicals, with the formation of cycles, bicycles or tricycles and where the bridging atoms, in addition to carbon, can also be heteroatoms, with 1-18 carbon atoms and where every $R^1$-$R^4$ radical also has one or more alcohol, amino, ester, keto, thio, urethane, urea, allophanate groups, double bonds, triple bonds, or halogen atoms, and $R^5$ is a n alkyl, aryl, aralkyl, heteroalkyl, alkoxyalkyl radical, linear or branched with 1-18 carbon atoms and can also have one or more alcohol, amino, ester, keto, thio, urethane, urea, allophanate groups, double bonds, triple bonds or halogen atoms.

D) optionally, 0.1 to 10% by weight of at least one compound that is reactive with acid groups, based on a total amount of the composition, so that the two components A) and B) are in a such ratio that there is 0.3 to 1 uretdione group of component A) for each hydroxyl group of component B), and the proportion of the catalysts under C) is 0.001-3% by weight based on the total weight of components A) and B).

The melting point of the uretdione-containing powder coating hardener includes all values and subvalues therebetween, especially including 50, 60, 70, 80, 90, 100, 110 and 120° C. The free NCO content of the uretdione-containing powder coating hardener includes all values and subvalues between 0 and less than 5% by weight, especially including 0.5, 1, 1.5, 2, 2.5, 3, 3.5, 4 and 4.5% by weight. The uretdione content of the uretdione-containing powder coating hardener includes all values and subvalues therebetween, especially including 8, 10, 12, 14 and 16% by weight. The melting point of the hydroxyl-containing polymer includes all values and subvalues therebetween, especially including 50, 60, 70, 80, 90, 100, 110 and 120° C. The OH number of the hydroxyl-containing polymer includes all values and subvalues therebetween, especially including 30, 40, 50, 60, 70, 80, 90, 100, 110, 120, 130, 140, 150, 160, 170, 180 and 190 mg KOH/g. The amount of uretdione groups of A) per hydroxyl groups of B) includes all values and subvalues therebetween, especially including 0.2, 0.3, 0.4, 0.5, 0.6, 0.7, 0.8 and 0.9. The amount of C) includes all values and subvalues therebetween, especially including 0.005, 0.01, 0.05, 0.1, 0.5, 1, 1.5, 2 and 2.5% by weight.

Polyisocyanates containing uretdione groups are well known and are described, for example in U.S. Pat. Nos. 4,476, 054, 4,912,210, 4,929,724 and EP 417 603. J. Prakt. Chem. 336 (1994) 185-200 provides a comprehensive overview of industrially relevant processes for the dimerization of isocyanates to uretdiones. As a rule, the conversion of isocyanates to uretdiones takes place in the presence of soluble dimerization catalysts such as dialkyl aminopyridines, trialkyl phosphines, phosphorous acid triamides or imdidazoles. The reaction -optionally in solvent, but preferably carried out in the presence of solvents -is stopped when a desired conversion is achieved by adding catalyst poisons. Superfluous monomeric isocyanate is then separated off through short-path evaporation. If the catalyst is volatile enough the reaction mixture can be freed of catalyst in the course of the monomer separation. In this case it is not necessary to add catalyst poisons. In principle a wide range of isocyanates are suitable for manufacturing uretdione polyisocyanates. According to the present invention isophoron diisocyanate (IPDI), hexamethylene diisocyanate (HDI), 2-methylpentane diisocyanate (MPDI), 2,2,4-trimethyl-hexamethylene-diisocyanate/2,4,4-trimethyl-hexamethylene diisocyanate (TMDI), norbomane diisocyanate (NBDI), methylene diphenyldiisocyanate (MDI) and tetramethylxylylene diisocyanate (TMXDI) are preferred. Particularly preferred are IPDI and HDI.

The conversion of these uretdione group bearing polyisocyanates to uretdione powder coating hardeners A) includes the reaction of the free NCO groups with monomers or polymers containing hydroxyl groups such as polyesters, polythioethers, polyethers, polycaprolactams, polyepoxides, polyester amides, polyurethanes or low-molecular di, tri, and/or tetraalcohols as chain extenders and, optionally monoamines and/or monoalcohols as chain stoppers and has been described often (EP 669 353, EP 669 354, DE 30 30 572, EP 639 598 or EP 803 524). Low-molcular (monomeric) dialcohols are preferred. Preferred low-molecular diols are ethyleneglycol, propanediol-(1,2); propanediol-(1,3); 2,2-dimethylpropane-(1,3), butandiol-(1,4), hexanediol-(1,6), 2-methylpentanediol-(1,5), 2,2,4-trimethylhexanediol-(1,6), 2,4,4-trimethylhexanediol-(1,6), heptanediol (1,7), dodecanediol-(1,12), octa-decene-9,10-diol-(1,12), thioglycol, octandecanediol-(1,18), 2,4-dimethyl-2-propylheptane-diol-(1,3), diethyleneglycol, triethyleneglycol, tetraethyleneglycol, trans-and cis-1,4-cyclohexane-dimethanol. Preferred low-molecular triols are glycerin, hexanetriol-(1,2,6), 1,1,1-trimethylol-propane and trimethylol-ethane. A preferred low-molecular tetraol is pentarythrit. Preferred uretdione powder coating hardeners A) have a free NCO content of less than 5% by weight and a uretdione group content of 6 to 18% by weight (calculated as $C_2N_2O_2$, molecular weight 84). Preferred are polyesters and monomeric dialcohols. Apart from the uretdione groups the powder coating hardeners can also contain isocyanurate, biuret, allophanate, urethane and/or urea structures.

Preferably polyesters, polyethers, polyacrylates, polyurethanes and/or polycarbonates with an OH value of 20-200 (in mg KOH/gram) are used for the hydroxyl group polymers B). Particularly preferably polyesters with an OH value of 30-150, an average molecular weight of 500-6000 g/mol and a melting point between 40 and 130° C. are used. Binders such as these have, for example, been described in EP 669 354 and EP 254 152. Of course mixtures of these polymers can also be used. The quantity of polymers B) containing hydroxyl groups is chosen so that there is 0.3 to 1 uretdione group of component A) for each hydroxyl group of component B).

Another object of the present invention is the use of at least one catalyst with the formula $[NR^1R^2R^3R^4]^+[R^5COO]^-$, wherein $R^1$-$R^4$ simultaneously or independent of each other can be alkyl, aryl, aralkyl, heteroaryl, alkoxyalkyl radicals, optionally linear or branched, unbridged or bridged with other $R^1$-$R^4$ radicals, with the formation of cycles, bicycles or tricycles and where the bridging atoms, in addition to carbon, can also be heteroatoms, with 1-18 carbon atoms and where every $R^1$-$R^4$ radical also has one or more alcohol, amino, ester, keto, thio, urethane, urea, allophanate groups, double bonds, triple bonds, or halogen atoms and $R^5$ is a n alkyl, aryl, aralkyl, heteroalkyl, alkoxyalkyl radical, linear or branched with 1-18 carbon atoms and can also have one or more alcohol, amino, ester, keto, thio, urethane, urea, allophanate groups, double bonds, triple bonds or halogen atoms in the polyurethane powder coating composition and in the catalysts itself.

The catalysts according to the present invention C) comply with the formula $[NR^1R^2R^3R^4]^+[R^5COO]^{31}$ wherein $R^1$-$R^4$ simultaneously or independent of each other can be alkyl, aryl, aralkyl, heteroaryl, alkoxyalkyl radicals, optionally linear or branched, unbridged or bridged with other $R^1$-$R^4$ radicals, with the formation of cycles, bicycles or tricycles and where the bridging atoms, in addition to carbon, can also be heteroatoms, with 1-18 carbon atoms and where every $R^1$-$R^4$ radical also has one or more alcohol, amino, ester, keto, thio, urethane, urea, allophanate groups, double bonds, triple bonds, or halogen atoms, and $R^5$ is an alkyl, aryl, aralkyl, heteroalkyl, alkoxyalkyl radical, linear or branched with 1-18 carbon atoms and can also have one or more alcohol, amino, ester, keto, thio, urethane, urea, allophanate groups, double bonds, triple bonds, or halogen atoms. Examples of such catalysts are tetramethyl ammonium formiate, tetramethyl ammonium acetate, tetramethyl ammonium propionate, tetramethyl ammonium butyrate, tetramethyl ammonium benzoate, tetraethyl ammonium formiate, tetraethyl ammonium acetate, tetraethyl ammonium propionate, tetraethyl ammonium butyrate, tetraethyl ammonium benzoate, tetrapropyl ammonium formiate, tetrapropyl ammonium acetate, tetrapropyl ammonium propionate, tetrapropyl ammonium butyrate, tetrapropyl ammonium benzoate, tetrabutyl ammonium formiate, tetrabutyl ammonium acetate, tetrabutyl ammonium propionate, tetrabutyl ammonium butyrate, and tetrabutyl ammonium benzoate. Of course mixtures of these catalysts can also be used. Tetrabutyl ammonium benzoate and tetrabutyl ammonium acetate are used particularly preferably. They are contained in a quantity of 0.001-3% by weight, preferably 0.01-3% by weight in relation to components A) and B) in the powder coating composition. The catalysts can contain water of crystallization, although this is not considered when calculating the quantity of catalyst to be used. The quantity of water is neglected during the calculation. A variant according to the present invention includes the polymeric bonding of such catalysts C) to powder coating hardeners A) or polymers containing hydroxyl groups B). For example free alcohol, thio, or amino groups of ammonium salts can be converted with acid, isocyanate, or glycidyl groups of the powder coating hardener A) or polymers containing hydroxyl groups B) in order to integrate the catalysts C) into the polymeric bond.

In this connection, it must be considered that the activity of these catalysts is considerably reduced in the presence of acids. The usual reaction partners of the uretdione powder coating hardeners include polyesters containing hydroxyl groups. Due to the method by which polyesters are manufactured they can contain small quantities of acid groups. The amount of acid groups in the polyester should be less than 20 mg KOH/g, as otherwise the catalysts would be too inhibited. The amount of acid groups in the polyester includes all values and subvalues between 0 and less than 20 mg KOH/g, especially including 2, 4, 6, 8, 10, 12, 14, 16 and 18 mg KOH/g. In the presence of polyesters bearing such acid groups it would be possible either to use the above-mentioned catalysts in excess of the acid groups or to add reactive compounds that are able to trap acid groups. Both mono-functional and multi-functional compounds could be used for this purpose. Although the possible cross-linking effect of the multi-functional compounds is undesired due to the viscosity increasing effect, this generally does not interfere due to the low concentration.

Reactive acid trapping compounds D) are generally known in coatings chemistry. For example, epoxy compounds, carbodiimides, hydroxyalkylamides, and also 2-oxazolines react with acid groups at higher temperatures. Preferred compounds include triglycidyl ether isocyanurate (TGIC), EPIKOTE® 828 (diglycidyl ether based on bisphenol A, from Shell), Versatic acid glycidyl ester, ethylhexylglycidyl ether, butylglycidyl ether, POLYPOX R16 (pentaerythrit tetraglycidyl ether, by UPPC AG). VESTAGON EP HA 320, (Hydroxyalkylamide, by Degussa AG), as well as phenylene bisoxazoline, 2-methyl-2-oxazoline, 2-hydroxyethyl-2-oxazoline, 2-hydroxypropyl-2-oxazoline and 5-hydroxypentyl-2-oxazoline. Of course mixtures of these substances can also be used. These reactive compounds can be used in percentages by weight of 0.1 to 10%, preferably 0.5 to 3%, in relation to the total formulation. The amount of these reactive compounds includes all values and subvalues therebetween, especially including 0.5, 1, 1.5, 2, 2.5, 3, 3.5, 4, 4.5, 5, 5.5, 6, 6.5, 7, 7.5, 8, 8.5, 9 and 9.5% by weight.

For the manufacture of the powder coating the usual additives known in powder coating technology E) such as flow-control agents, e.g. polysilicones or acrylates, light protection agents e.g. sterically hindered amines, or other auxiliary agents such as, for example those described in EP 669 353 can be added up to a total quantity of 0.05 to 5% by weight. Fillers and pigments such as titanium dioxide can be added in quantities of up to 50% by weight in relation to the total composition. The amount of additives includes all values and subvalues therebetween, especially including 0.1, 0.5, 1, 1.5, 2, 2.5, 3, 3.5, 4 and 4.5%. The amount of fillers includes all values and subvalues therebetween, especially including 5, 10, 15, 20, 25, 30, 35, 40, and 45% by weight.

Optionally, additional catalysts such as those already known in polyurethane chemistry can be contained. These are mainly organometallic catalysts such as dibutyl tin dilaurate, or also tertiary amines such as 1,4-diazabicylco[2,2,2,]octane, in quantities of 0.00 1-1% by weight. The amount of additional catalysts includes all values and subvalues therebetween, especially including 0.005, 0.01, 0.05, 0.1, 0.2, 0.3, 0.4, 0.5, 0.6, 0.7, 0.8 and 0.9% by weight.

Under normal conditions (DBTL catalysis) conventional powder coating compositions containing uretdione only harden from 180° C. With the help of the low temperature hardening powder coating composition according to the present invention at a maximum of 160° C. curing temperature (also lower curing temperatures are quite possible) it is possible to save energy and (curing) time as well as coat many temperature-sensitive substrates which would exhibit undesirable discoloration, decomposition, or brittleness effects at 180° C. Besides metal, glass, wood, leather, plastics, and MDF boards, specific aluminum surfaces are also very suitable for this treatment. In the latter case a too high temperature burden causes an undesirable change in the crystal structure.

The homogenization of all constituents to manufacture a powder coating can be carried out in suitable aggregates such as heated kneading machines, but preferably by extruding, in which case temperatures of 120 to 130° C. should not be exceeded. The extruded mass is cooled to room temperature and then comminuted in a suitable manner before being ground to a sprayable powder. The sprayable powder can be applied to suitable substrates by known processes such as electrostatic powder spraying, fluidized-bed coating, or electrostatic fluidized-bed coating. When the powder has been applied the coated work pieces are heated to cure them for 4 to 60 minutes to a temperature of 120 to 160° C., preferably 6 to 30 minutes at 120 to 160° C. The curing temperature includes all values and subvalues therebetween, especially including 125, 130, 135, 140, 145, 150, and 155° C. The curing time includes all values and subvalues therebetween, especially including 5, 10, 15, 20, 25, 30, 35, 40, 45, 50 and 55 minutes.

Having generally described this invention, a further understanding can be obtained by reference to certain specific examples which are provided herein for purposes of illustration only, and are not intended to be limiting unless otherwise specified.

EXAMPLES

| Feedstock | Product description, manufacturer |
|---|---|
| VESTAGON BF 1320 | Powder coating hardener, from Degussa AG, Coatings & Colorants, uretdione content 13.8%, melting temperature 99-112° C. $T_G$ 87° C. |
| CRYLCOAT 240 | OH polyester, OH value: 24.5; AV: 3.3; from UCB |
| ARALDIT PT 810 | Triglycidylether isocyanurate (TGIC), from Vantico |
| KRONOS 2160 | Titanium dioxide, from Kronos |
| RESIFLOW PV 88 | Flow-control agent, from Worlee |
| TBAB | Tetrabutylammoniumbenzoate, from Aldrich |
| DBTL | Dibutyl tin dilaurate, from Crompton Vinyl Additives GmbH |

OH value: consumption in mg KOH/g polymer; AV: acid value, consumption in mg KOH/g polymer $T_G$: glass transition point; WC: water content in % by weight General manufacturing specification for the powder coatings:

The comminuted feedstock—powder coating hardener, hydroxy functional polymers, catalysts, acid catcher, flow-control agent—are mixed intimately in a pan crusher and are then homogenized in an extruder at a maximum temperature of 130° C. After cooling the extrudate is broken and ground with a pin mill to a particle size of <100 µm. The powder which has been produced in this manner is applied to degreased sheet iron with an electrostatic powder spraying plant at 60 kV and stoved in a circulating air drier.

Powder coating compositions (in % by weight, apart from OH/UD, which were prepared according to the above procedure)

| Examples | VESTAGON BF 1320 | CRYLCOAT 240 | TBAB | DBTL | OH/UD |
|---|---|---|---|---|---|
| 1 | 11.37 | 45.52 | 0.61 | | 1.00:0.75 |
| 2 | 14.18 | 42.56 | 0.76 | | 1.00:1.00 |
| V1* | 10.53 | 46.51 | | 0.46 | 1.00:0.75 |
| V2* | 13.17 | 43.75 | | 0.58 | 1.00:1.00 |

*Comparison Examples
OH/UD: ratio of OH groups to uretdione group (mol:mol)

In addition, 40.0% by weight KRONOS 2160, 1.0% by weight RESIFLOW PV 88, and 1.5% by weight ARALDIT PT 810 were added to each of the formulations.

Results of hardening after 30 min. at 160° C.:

| Examples | Cupping index [mm] | Ball impact direct [inch × lb] | Comment |
|---|---|---|---|
| 1 | >11.0 | >80 | cured |
| 2 | >10.0 | 160 | cured |
| V1* | 0.5 | 30 | not cured |
| V2* | 0.5 | 20 | not cured |

Cupping index according to DIN 53 156
Ball impact according to ASTM D 2794-93

German patent application 10320266.8 filed May 3, 2003, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A highly reactive polyurethane powder coating composition, comprising:
    A) at least one uretdione powder coating hardener, based on aliphatic, (cyclo)aliphatic or cycloaliphatic polyisocyanates and compounds containing hydroxyl groups, said hardener having a melting point of 40 to 130° C., a free NCO content of less than 5% by weight and a uretdione content of 6-18% by weight,
    B) at least one polymer containing a hydroxyl group with a melting point of 40 to 130° C. and an OH value between 20 and 200 mg KOH/g,
    C) 0.001-3% by weight, based on a total weight of components A) and B), of at least one catalyst having the formula $[NR^1R^2R^3R^4]^+[R^5COO]^-$,
    wherein $R^1$-$R^4$ simultaneously or independent of each other are alkyl, aryl, aralkyl, heteroaryl, alkoxyalkyl radicals, optionally linear or branched, unbridged or bridged with other $R^1$-$R^4$ radicals, with the formation of cycles, bicycles or tricycles and wherein the bridging atoms, in addition to carbon, are optionally heteroatoms, with 1-18 carbon atoms and wherein every $R^1$-$R^4$ radical also has at least one group selected from the group consisting of alcohol, amino, ester, keto, thio, urethane, urea, allophanate groups, double bonds, triple bonds, and halogen atoms, and
    $R^5$ is an alkyl, aryl, aralkyl, heteroalkyl, alkoxyalkyl radical, linear or branched with 1-18 carbon atoms and optionally having one or more alcohol, amino, ester, keto, thio, urethane, urea, allophanate groups, double bonds, triple bonds or halogen atoms;
    wherein components A) and B) are in such a ratio so that there is 0.3 to 1 uretdione group of component A) for each hydroxyl group of component B).

2. The polyurethane powder coating composition as claimed in claim 1, further comprising
    0.1 to 10% by weight of at least one compound reactive with acid groups, based on a total amount of said composition, as component (D).

3. The polyurethane powder coating composition as claimed in claim 1, further comprising E) an auxillary and/or additive.

4. The polyurethane powder coating composition as claimed in claim 1,
comprising:
uretdione-containing powder coating hardeners A) obtained from a diisocyanate selected from the group consisting of isophorone diisocyanate (IPDI), hexamethylene diisocyanate (HDI), 2-methylpentane diisocyanate (MPDI), 2,2,4-trimethylhexamethylene diisocyanate (TMDI), norbornane diisocyanate (NBDI), methylenediphenyl diisocyanate (MDI), and tetramethylxylylene diisocyanate (TMXDI), and mixtures thereof.

5. The polyurethane powder coating composition as claimed in claim 4, comprising uretdione-containing powder coating hardeners obtained from at least one diisocyanate selected from the group consisting of isophorone diisocyanate, hexamethylene diisocyanate, and mixtures thereof.

6. The polyurethane powder coating composition as claimed in claim 1, comprising uretdione-containing powder coating hardeners A) obtained from a compound selected from the group consisting of hydroxyl-containing polyesters, polythioethers, polyethers, polycaprolactams, polyepoxides, polyesteramides, polyurethanes, low-molecular di-alcohols, low-molecular tri-alcohols, low-molecular tetra-alcohols, mono-amines, mono-alcohols and mixtures thereof.

7. The polyurethane powder coating composition as claimed in claim 6, comprising at least one compound selected from the group consisting of polyesters, low-molecular di-alcohols and mixtures thereof.

8. The polyurethane powder coating composition as claimed in claim 1, wherein said hydroxyl-containing polymer B) is selected from the group consisting of polyesters, polyethers, polyacrylates, polyurethanes, polycarbonates, and mixtures thereof.

9. The polyurethane powder coating composition as claimed in claim 1,
wherein component B) comprises polyesters having an OH number of from 30 to 150 mg KOH/g, and an average molecular weight of from 500 to 6000 g/mol, and a melting point of between 40 and 130° C.

10. The polyurethane powder coating composition as claimed in claim 1, wherein said catalyst C) is selected from the group consisting of tetramethyl ammonium formate, tetramethyl ammonium acetate, tetramethyl ammonium propionate, tetramethyl ammonium butyrate, tetramethyl ammonium benzoate, tetraethyl ammonium formate, tetraethyl ammonium acetate, tetraethyl ammonium propionate, tetraethyl ammonium butyrate, tetraethyl ammonium benzoate, tetrapropyl ammonium formate, tetrapropyl ammonium acetate, tetrapropyl ammonium propionate, tetrapropyl ammonium butyrate, tetrapropyl ammonium benzoate, tetrabutyl ammonium formate, tetrabutyl ammonium acetate, tetrabutyl ammonium propionate, tetrabutyl ammonium butyrate, and tetrabutyl ammonium benzoate, and mixtures thereof.

11. The polyurethane powder coating composition as claimed in claim 2,
wherein said component D) is selected from the group consisting of epoxy compounds, carbodiimides, hydroxyalkylamides, 2-oxazolines and mixtures thereof.

12. The polyurethane powder coating composition as claimed in claim 1,
comprising triglycidyl ether isocyanurate, diglycidyl ether based on bisphenol A, versatic acid glycidyl ester, hydroxyalkylamide, phenylenebisoxazoline, 2-methyl-2-oxazoline, 2-hydroxyethyl-2-oxazoline, 2-hydroxypropyl-2-oxazoline, 5-hydroxypentyl-2-oxazoline, or mixtures thereof.

13. The polyurethane powder coating composition as claimed in claim 1, further comprising component E) which comprises flow-control agents, light protection agents, fillers, additional catalysts, or pigments.

14. A process for preparing a highly reactive polyurethane powder coating composition, comprising:
admixing the following components A), B), C) and optionally D) in a heatable mixer at a temperature of not more than 130° C.;
wherein
A) at least one uretdione powder coating hardener, based on aliphatic, (cyclo)aliphatic or cycloaliphatic polyisocyanates and compounds containing hydroxyl groups, said hardener having a melting point of 40 to 130° C., a free NCO content of less than 5% by weight and a uretdione content of 6-18% by weight,
B) at least one polymer containing a hydroxyl group with a melting point of 40 to 130° C. and an OH value between 20 and 200 mg KOH/g,
C) 0.001-3% by weight, based on a total weight of components A) and B), of at least one catalyst having the formula $[NR^1R^2R^3R^4]^+[R^5COO]^-$,
wherein $R^1$-$R^4$ simultaneously or independent of each other are alkyl, aryl, aralkyl, heteroaryl, alkoxyalkyl radicals, optionally linear or branched, unbridged or bridged with other $R^1$-$R^4$ radicals, with the formation of cycles, bicycles or tricycles and wherein the bridging atoms, in addition to carbon, are optionally heteroatoms, with 1-18 carbon atoms and wherein every $R^1$-$R^4$ radical also has at least one group selected from the group consisting of alcohol, amino, ester, keto, thio, urethane, urea, allophanate groups, double bonds, triple bonds, and halogen atoms, and
$R^5$ is an alkyl, aryl, aralkyl, heteroalkyl, alkoxyalkyl radical, linear or branched with 1-18 carbon atoms and optionally having one or more alcohol, amino, ester, keto, thio, urethane, urea, allophanate groups, double bonds, triple bonds or halogen atoms;
D) optionally, 0.1 to 10% by weight of at least one compound that is reactive with acid groups, based on a total amount of said powder coating composition,
wherein components A) and B) are in a such ratio so that there is 0.3 to 1 uretdione group of component A) for each hydroxyl group of component B).

15. A method of curing a powder coating composition, comprising:
curing the powder coating composition according to claim 1 at a temperature of not more than 160° C.

16. A method of coating a substrate, comprising:
coating a substrate with the powder coating composition according to claim 1.

17. The method as claimed in claim 16, wherein said substrate comprises a metal, a plastic, wood, glass, leather or other heat-resistant substrates.

18. The method as claimed in claim 16, wherein said substrate is a heat-resistant substrate.

19. A metal coating composition, comprising:
the polyurethane powder coating composition according to claim 1.

20. A wood coating composition, comprising:
the polyurethane powder coating composition according to claim 1.

21. A leather coating composition, comprising:
the polyurethane powder coating composition according to claim 1.

22. A plastics coating composition, comprising:
the polyurethane powder coating composition according to claim 1.

23. A metal coated with the composition according to claim 19.

24. A wood coated with the composition according to claim 20.

25. A leather coated with the composition according to claim 21.

26. A plastic coated with the composition according to claim 22.

27. An automobile body, a motorbike, a bicycle, a construction component, or a household appliance coated with the metal coating as claimed in claim 19.

28. The coating composition as claimed in claim 19, further comprising:
D) at 0.1 to 10% by weight of at least one compound which is reactive toward an acid group, based on a total weight of said composition.

29. The coating composition as claimed in claim 19, further comprising E) auxiliaries and/or additives.

30. The coating composition as claimed in claim 20, further comprising:
D) at 0.1 to 10% by weight of at least one compound which is reactive toward an acid group, based on a total weight of said composition.

31. The coating composition as claimed in claim 20, further comprising E) auxiliaries and/or additives.

32. The coating composition as claimed in claim 21, further comprising:
D) at 0.1 to 10% by weight of at least one compound which is reactive toward an acid group, based on a total weight of said composition.

33. The coating composition as claimed in claim 21, further comprising E) auxiliaries and/or additives.

34. The coating composition as claimed in claim 22, further comprising:
D) at 0.1 to 10% by weight of at least one compound which is reactive toward an acid group, based on a total weight of said composition.

35. The coating composition as claimed in claim 22, further comprising E) auxiliaries and/or additives.

* * * * *